(12) United States Patent
Bly et al.

(10) Patent No.: US 7,277,389 B2
(45) Date of Patent: Oct. 2, 2007

(54) SYSTEMS AND METHODS FOR GROUPING OF BANDWIDTH ALLOCATIONS

(75) Inventors: Keith Michael Bly, Newman Lake, WA (US); C Stuart Johnson, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 1030 days.

(21) Appl. No.: 10/231,788

(22) Filed: Aug. 29, 2002

(65) Prior Publication Data

US 2004/0042399 A1 Mar. 4, 2004

(51) Int. Cl.
*H04J 3/14* (2006.01)
*H04L 12/28* (2006.01)
*H04L 12/54* (2006.01)

(52) U.S. Cl. .............................. 370/230.1; 370/395.41; 370/412; 370/428

(58) Field of Classification Search ............. 370/230.1, 370/395.41, 412, 428
See application file for complete search history.

(56) References Cited

U.S. PATENT DOCUMENTS

| | | | | |
|---|---|---|---|---|
| 5,164,938 A | * | 11/1992 | Jurkevich et al. ............ 370/231 |
| 5,748,629 A | * | 5/1998 | Caldara et al. ............. 370/389 |
| 5,872,769 A | * | 2/1999 | Caldara et al. ............. 370/230 |
| 5,953,318 A | * | 9/1999 | Nattkemper et al. ........ 370/236 |
| 5,999,518 A | * | 12/1999 | Nattkemper et al. ........ 370/258 |
| 5,999,563 A | | 12/1999 | Polley et al. ............... 375/222 |
| 6,031,573 A | | 2/2000 | MacCormack et al. ..... 348/401 |
| 6,052,375 A | * | 4/2000 | Bass et al. .................. 370/412 |
| 6,067,298 A | | 5/2000 | Shinohara ............... 370/395.71 |
| 6,084,856 A | | 7/2000 | Simmons et al. ........... 370/235 |
| 6,157,955 A | | 12/2000 | Narad et al. ................ 709/228 |
| 6,195,355 B1 | | 2/2001 | Demizu ...................... 370/397 |
| 6,259,699 B1 | | 7/2001 | Opalka et al. .............. 370/398 |
| 6,275,497 B1 | | 8/2001 | Varma et al. ............... 370/431 |
| 6,343,081 B1 | | 1/2002 | Blanc et al. ................ 370/411 |
| 6,438,134 B1 | * | 8/2002 | Chow et al. ................ 370/412 |
| 6,477,144 B1 | | 11/2002 | Morris et al. ............. 370/230.1 |
| 6,487,212 B1 | | 11/2002 | Erimli et al. ............... 370/413 |
| 6,628,652 B1 | | 9/2003 | Chrin et al. ................ 370/386 |
| 6,714,553 B1 | * | 3/2004 | Poole et al. ................. 370/412 |
| 6,754,206 B1 | * | 6/2004 | Nattkemper et al. ........ 370/369 |
| 6,950,400 B1 | | 9/2005 | Tran et al. .................. 370/236 |
| 6,980,552 B1 | | 12/2005 | Belz et al. .................. 370/392 |
| 7,042,841 B2 | | 5/2006 | Abdelilah et al. .......... 370/229 |
| 7,058,789 B2 | * | 6/2006 | Henderson et al. ......... 711/220 |

(Continued)

*Primary Examiner*—Alpus H. Hsu
(74) *Attorney, Agent, or Firm*—Wells St. John P.S.

(57) ABSTRACT

A data traffic shaping system, comprises a plurality of burst groups, each burst group having a burst group credit allocation mechanism configured to earn credit over time; a shaping engine configured to manage incoming entries of traffic and to assign each incoming entry of traffic to a selected queue of the burst group depending on the characteristics of the entry; a plurality of queues, respective queues belonging to respective burst groups; and a bandwidth allocation table including locations identifying a queue and an amount of bandwidth credit to allocate to that queue, the shaping engine being configured to traverse the locations, to determine the bandwidth earned by the queues, such credit only being made available to the queue if its assigned burst group has at least that much credit available at that instant in time, and to process an entry in that queue only if the queue has earned a predetermined minimum amount of credit, relative to the current entry on the queue in question.

22 Claims, 4 Drawing Sheets

U.S. PATENT DOCUMENTS

| | | | |
|---|---|---|---|
| 7,072,295 B1 * | 7/2006 | Benson et al. | 370/230 |
| 2001/0001608 A1 | 5/2001 | Parruck et al. | 370/232 |
| 2001/0009552 A1 | 7/2001 | Parruck et al. | 370/412 |
| 2001/0017866 A1 | 8/2001 | Takada et al. | 370/535 |
| 2001/0018711 A1 | 8/2001 | Morris | 709/229 |
| 2001/0030956 A1 | 10/2001 | Chillariga et al. | 370/348 |
| 2001/0038628 A1 | 11/2001 | Ofek et al. | 370/392 |
| 2001/0055303 A1 | 12/2001 | Horton et al. | 370/389 |
| 2001/0055319 A1 | 12/2001 | Quigley et al. | 370/480 |
| 2002/0023168 A1 | 2/2002 | Bass et al. | 709/232 |
| 2002/0034162 A1 | 3/2002 | Brinkerhoff et al. | 370/229 |
| 2002/0044567 A1 | 4/2002 | Voit et al. | 370/467 |
| 2002/0071387 A1 | 6/2002 | Horiguchi et al. | 370/229 |
| 2002/0191622 A1 | 12/2002 | Zdan | 370/401 |
| 2003/0076848 A1 | 4/2003 | Bremler-Barr et al. | 370/412 |
| 2006/0233156 A1 | 10/2006 | Sugai et al. | 370/351 |

* cited by examiner

SYSTEMS AND METHODS FOR GROUPING OF BANDWIDTH ALLOCATIONS

TECHNICAL FIELD

The invention relates to methods and apparatus for improving communications in digital networks. The invention also relates to grouping of bandwidth allocations and burst groups in digital networks.

BACKGROUND OF THE INVENTION

Traffic shaping is important in digital networks. Traffic shaping involves buffering traffic and sending traffic based upon a desired profile. A traffic profile can include, but is not limited to, the following properties: a level of priority relative to other traffic, buffer depth, latency through the buffer, jitter in sending the traffic contained in the buffer, and a rate at which the traffic should be sent. A common approach to traffic shaping involves the use of a queuing system to manage the profile. As traffic arrives, it is placed on the queue. The traffic is de-queued based upon its assigned drain rate.

In certain situations it may be necessary to restrict a group of queues to a predefined amount of overall bandwidth. Doing so creates burst groups, in which the member queues compete for a common resource (bandwidth), but do not affect others outside the group. This allows the network to be better managed, where physical network connections can be subdivided into virtual "pipes" or "connections".

Problems with some prior devices include, for example, lack of scalability, sheer size and high gate-count cost per queue for decentralized shaping engines, expensive caching/arbitration mechanisms, and lack of ability to shape traffic with fine granularity across a broad spectrum of desired rates, or groups of rates.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Attention is directed to a commonly assigned patent application Ser. No. 10/224,508, titled "System and Method for Shaping Traffic from a Plurality Of Data Streams Using Hierarchical Queuing," and naming as inventors Keith Michael Bly and C Stuart Johnson, which is incorporated herein by reference. Attention is also directed to a commonly assigned patent application Ser. No. 10/224,353, titled Bandwidth Allocation Systems and Methods, and naming as inventors Keith Michael Bly and C Stuart Johnson, which is incorporated herein by reference.

Figure 1:
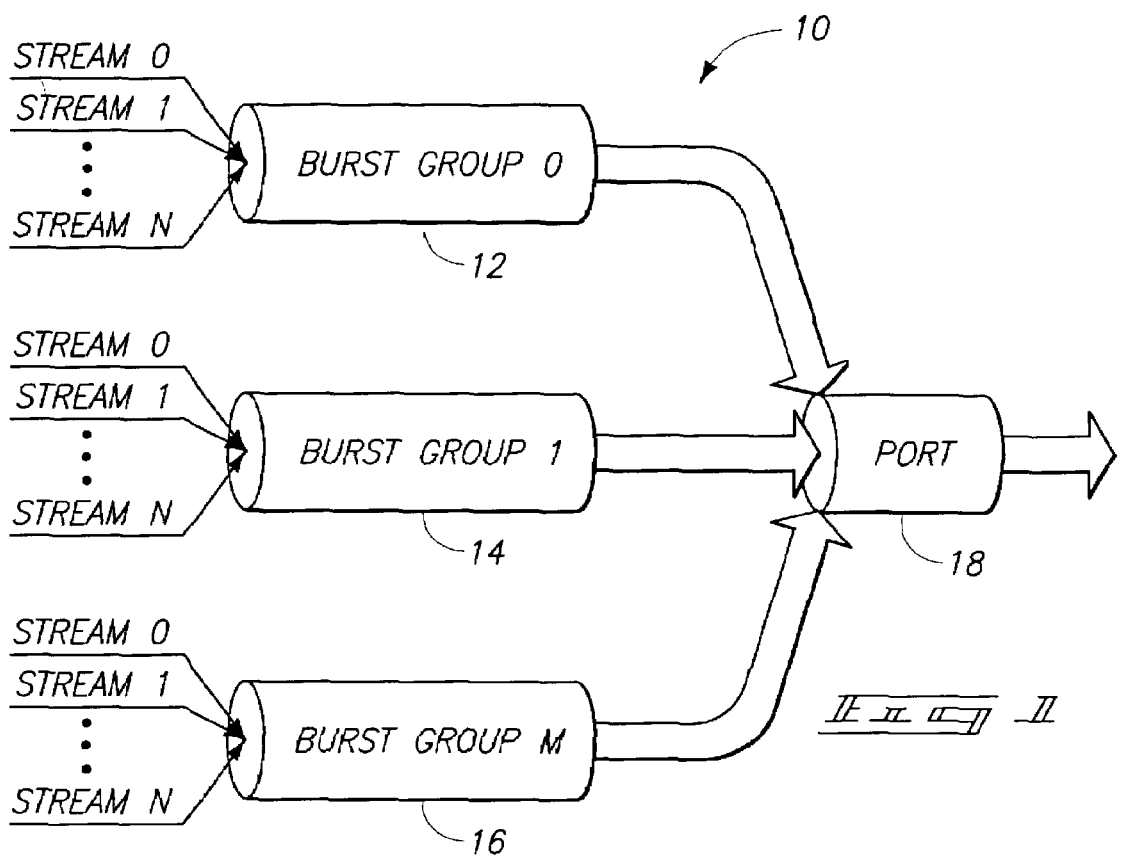
FIG. 1 is a block diagram showing multiple burst groups each receiving a plurality of incoming traffic streams.

When there are a large number of profiles or services to manage (e.g, more than 32), it is desirable to group or aggregate like profiles or services together to compete for common resources. This is desirable, for example, in order to protect one "type" of traffic from another, where "type" is a broad term used to classify traffic based on the needs of the moment. For example, a type of traffic could be "video traffic," "pay-per-view" video traffic, "all traffic for customer X," all email traffic, all traffic with a given priority, all traffic with the same MAC-DA (same first 6 octets of a frame), etc. This allows prevention of bursty traffic, for example, from stealing bandwidth from very smooth, jitter-intolerant traffic. FIG. 1 shows a system 10 for accomplishing this goal. Streams 0 to N of one type of traffic are aggregated into one group 12, streams of another type of traffic are aggregated into another group 14, streams of yet another type of traffic are aggregated into yet another group 16, etc. While three groups are shown leading to one port 18, any desired number of groups per port 18 are possible, and the system 10 may include multiple groups leading to multiple ports 18.

Figure 2:
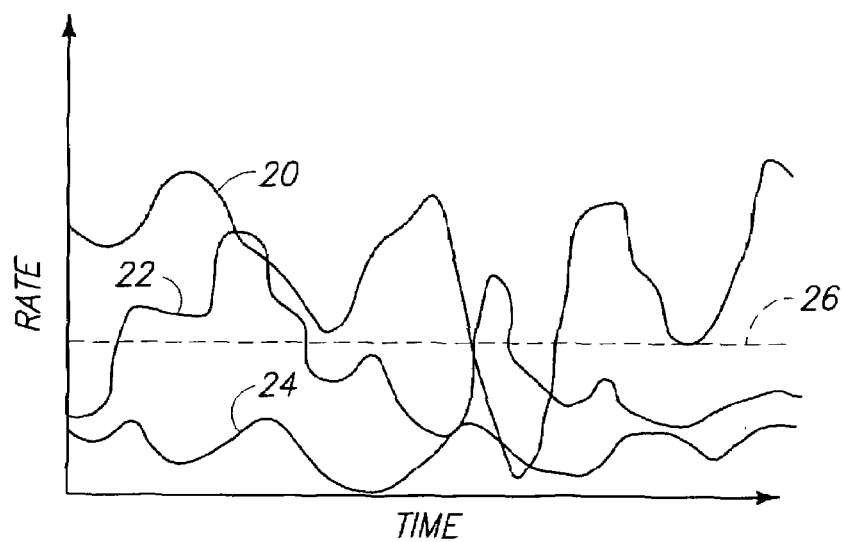
FIG. 2 is a plot of rate versus time illustrating the difference between the data traffic input rates for the input streams of a given burst group, and the available bandwidth for that group.

FIG. 2 shows the difference between data traffic input rate for input streams for a group 12, 14, or 16 relative to available bandwidth 26 for that group. The difference between available and desired burst group rate can be seen. It can also be seen that the streams 20, 22, and 24 themselves vary greatly in rate versus time.

Figure 3:
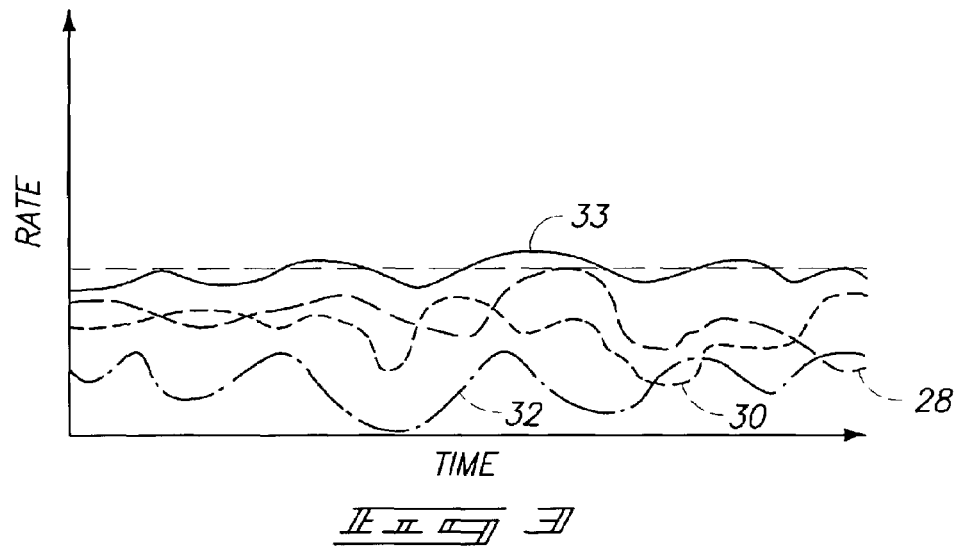
FIG. 3 is a plot of rate versus time illustrating resulting smoothed streams, once restricted to the available bandwidth of the burst group.

It is desired to smooth the streams as shown by curves 28, 30, and 32 in FIG. 3 such that their aggregate 33 is within profile, and does not steal from other groups of streams. This is performed by picking on the most offending streams, or based upon precedence of one or more streams over others. In FIG. 3, the resulting aggregate 33 approaches the available burst group rate over time.

The solution provided in accordance with one embodiment of the invention, based on the above commonly assigned patent applications, is to utilize multiple credit sources (burst groups), and to assign each queue 44-47 (FIG. 4) to be a member of one or more of the burst groups. These burst groups 12, 14, 16 are given a selectable allocation of credit at a steady rate. This credit is accumulated over time and doled out to the queue(s) 44-47 assigned to the burst group as will be described in more detail below.

Figure 4:
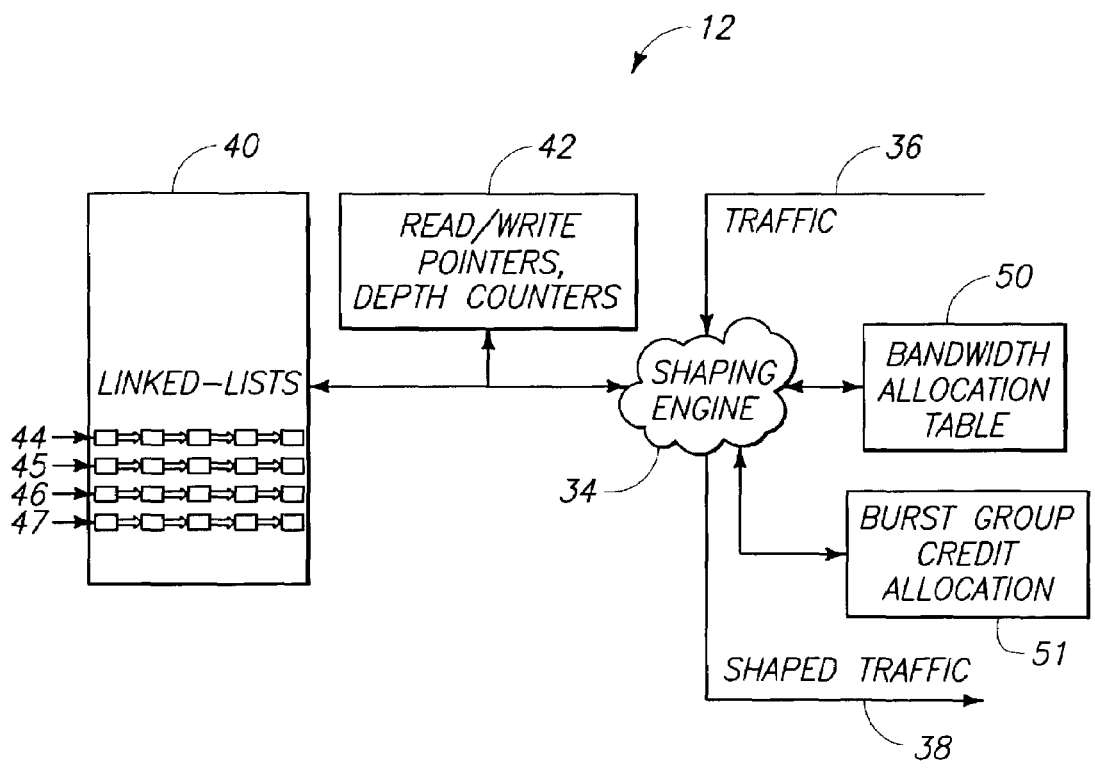
FIG. 4 is a block diagram illustrating construction details of the traffic shaping engine of FIG. 3.

FIG. 4 is a block diagram showing construction details of a burst group manager 12 including a shaping engine 34 receiving a plurality of incoming traffic streams collectively indicated by reference numeral 36. Shaped traffic 38 is transferred from the burst group manager 12 to a port or pipe 18 (FIG. 1).

The shaping engine 34 can be defined, for example by a microprocessor, or other digital circuitry. The burst group manager 12 includes linked lists 40 (see FIG. 4) which, together with pointers and counters 42, define queues. For illustration purposes, queues 44, 45, 46, and 47 are shown; however, different numbers of queues and different depths than illustrated are possible. Two tables are used to house the queues 44-47: one table 40 for the linked-lists, and the other table 42 to hold read/write and head/tail pointers, depth counters, etc., for the linked-lists. Other configurations are possible. The burst group manager 12 also includes a bandwidth allocation table 50 (FIG. 6) which will be described below in greater detail, and a burst group allocation mechanism.

Pointers and linked lists are known in the computer arts. A pointer is a variable that points to another variable by holding a memory address. A pointer does not hold a value but instead holds the address of another variable. A pointer points to the other variable by holding a copy of the other variable's address. A read/write pointer keeps track of a position within a file from which data can be read or written to. A linked list is a chain of records called nodes. Each node has at least two members, one of which points to the next item or node in the list. The first node is the head, and the last node is the tail. Pointers are used to arrange items in a linked list, as illustrated in FIG. 5.

Figure 5:
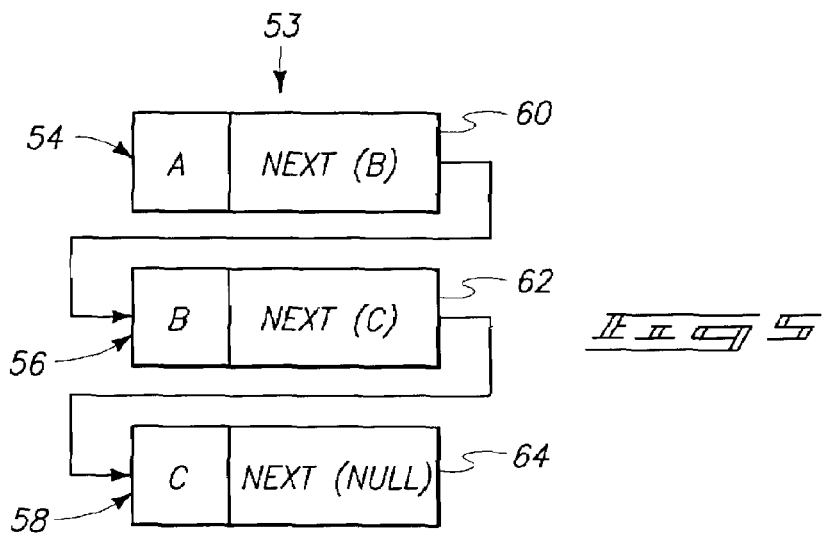
FIG. 5 is a simplified illustration of a linked list that could be used to store a single queue, a plurality of which are depicted in FIG. 4.

More particularly, FIG. 5 shows a simplified example of a linked list 53 of the type that could be included in the linked lists 40. Each entry or node 54, 56, and 58 (A, B, and C) includes a pointer 60, 62, and 64, respectively, pointing to another node. The linked lists 40 of FIG. 4 are arranged such that the queues 44-47 are all first-in, first out queues (FIFO).

The shaping engine 34 (see FIG. 4) en-queues incoming traffic 36 onto a selected one of the queues 44-47 based, for example, upon look-up information, which classifies the traffic. Streaming audio or video would be classified differently than e-mail, because streaming audio or video requires sufficient bandwidth to play without interruption. Therefore like-traffic, such as a stream or set of streams is placed in the same burst group 12, 14, or 16, in one embodiment. Within each burst group, further sub-classification can take place to determine on which one of the queues 44-47 the traffic 36 should be en-queued. "Like traffic" can be defined as desired for a particular application. It could be, for example, "all video traffic", or it could be "all pay-per-view" video traffic, or it could be "all traffic for customer X", or it could be "all email traffic." It is a grouping of traffic with similar needs. Video, for example requires a fast rate, with low latency and jitter influences. Email on the other hand, can be handled on a "best efforts" basis; i.e. low-priority, without regard to latency and jitter.

The queues 44-47 can have shaping profiles, which include properties such as: priority, depth, latency, jitter, and rate. For example, video needs to always get through. A large amount of latency is not desirable for video, as any latency will cause the resulting picture to become jerky, and fall behind. The same is true of the rate at which video is sent. A constant, consistent stream should be used to supply the video information "just in time" for the next entry or element (e.g., packet or frame) of the picture on a TV or computer. Therefore, "video" traffic is properly classified so that it is managed appropriately. Because the video must always get through, it is given a "high" priority. Because video cannot be influenced/slowed-down with a large amount of latency, the depth of the queue is selected to be shallow. Therefore, little data can build up, waiting in the queue. With regard to rate, the video queue gets its own bandwidth end-to-end on a switch, and does not have to compete with any other queue for bandwidth. Queues for other classifications of traffic would similarly have appropriately chosen priorities, depths, latencies, jitter, and rates.

In the illustrated embodiment, the rate-algorithm for the shaping queues 44-47 is a centralized time division multiplexing algorithm that is implemented, for example, by the shaping engine 34. More particularly, in the illustrated embodiment, the rate-algorithm for shaping traffic across many queues uses a table based credit allocation scheme. A fixed size bandwidth allocation table (BAT) 50 is traversed at a constant rate. Each location (e.g. row) 68-75 (FIG. 6) in the table identifies a queue 44-47 and the amount of credit to allocate to that queue 44-47. Because the table is traversed at a known rate, the desired rate for one of the queues 44-47 can be achieved by loading a specific number of entries in the table with a specific amount of credit for that shaping queue. This defines the rate at which entries can be de-queued from a queue per the following equation:

Queue Rate=(total credit in table for this queue)÷(time to traverse table)

As long as there is enough traffic to keep the queue from being empty, this drain rate can be maintained indefinitely. The rate itself is calculated by dividing the amount of credit listed in the table 50 by the time it takes to traverse the table 50 one time. A queue 44-47 is considered eligible to send an entry or element (e.g., a packet or, more particularly, a frame) when the queue 44-47 has acquired enough credit to send the entry in question.

In the illustrated embodiment, the shaping engine 34 manages both adding and deleting from the shaping queues, as well as updating the shaping queues with bandwidth tokens from the bandwidth allocation table 50.

Based upon the needs of the design in which this queuing structure is implemented, the size of the table 50 can be adjusted to provide the desired minimum and maximum achievable rates. The minimum rate is defined by one credit divided by the table traversal time, and the maximum rate is defined by the maximum number of entries allowed in the table, each containing the maximum number of credits, divided by the table traversal time. The maximum number of entries allowed in the table 50 is dictated by the implementation. For example, the maximum number of entries allowed in the table, is determined by the overall "profile" of the port(s) 18 supported by this queuing structure, etc. More particularly, the maximum number of entries allowed in the table is determined by the circuitry or software that manages traversing the table 50 relative to the number of queues 44-47 in the implementation, and how it manages updating the credit for each queue 44-47. Though a certain number of queues is shown in FIG. 4, other numbers are possible.

As the bandwidth allocation table 50 is traversed, the queue listed in the entry 68-75 requests the credit listed from its assigned burst group or groups. The burst group or groups respond with whatever credit they currently have available, if any. Over time, as long as the burst group or groups in question are not oversubscribed with queues requesting more credit than is available, the queues all get the credit they request. However, if a burst group is oversubscribed, not all queues will receive all the credit they request from it, thus protecting the overall system credit from "greedy" groups of queues. Only queues are listed in the bandwidth allocation table 50; burst groups earn credit in a different manner.

In one embodiment, burst groups earn credit more often than the queues, but in relatively lower amounts each time they are updated. This is intentional; and results in the burst group's credit being made more available across the entire time it takes to traverse the bandwidth allocation table 50. This results in a better distribution of credit across the bandwidth allocation table 50, allowing for more options when configuring the bandwidth allocation table 50. This burst group update rate is represented by an "Nth" request interval between burst group credit updates in FIG. 8, which will be described in more detail below.

More particularly, in one embodiment, burst groups earn credit using a simple periodic add function such as the following:

0: burst_bucket_a=burst_bucket_a+burst_credit_a;
1: wait N;
2: goto 0;

where 'a' is the burst group number, and 'N' is the time to wait between updates. If there are 'B' burst groups, then there would be 'B' independent programs running in parallel (in a software embodiment) or 'B' independent burst group credit allocation mechanisms or circuits 51 (see FIG. 4) handling this in parallel (in a hardware embodiment).

Figure 6:
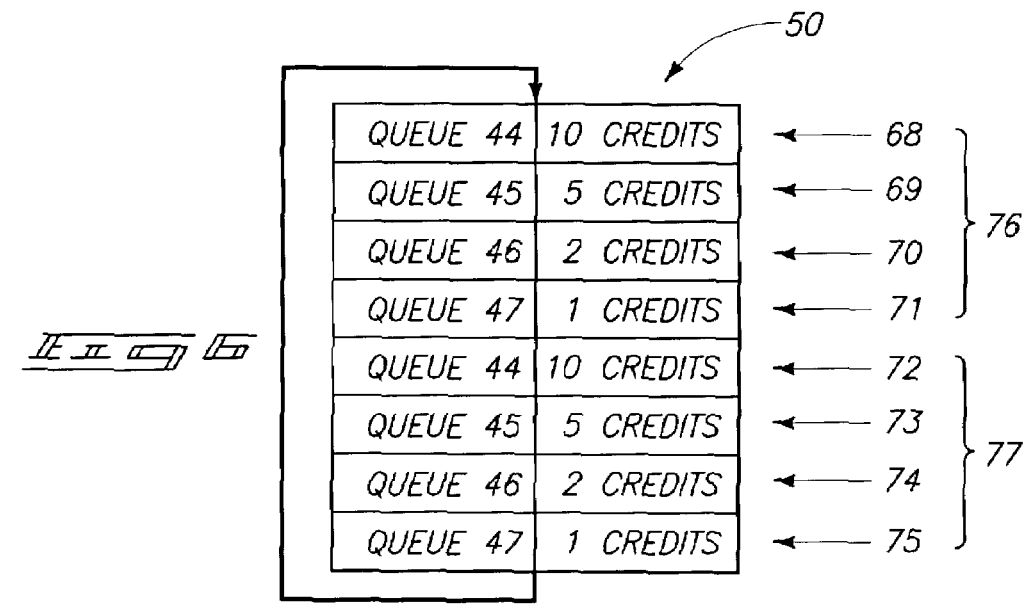
FIG. 6 illustrates a table based credit allocation scheme, as defined in FIG. 4.

FIG. 6 shows two burst update periods 76 and 77. The bandwidth allocation table 50 defines the burst update period to be four queue updates. Thus, once every four queue updates, the credit for the burst group or groups is updated. Assuming more than one burst group exists, all burst groups are updated at the same time, in parallel.

The queues 44-47 have an upper bound on the amount of credit they can accumulate. This protects the system 10 by not allowing a queue that has been idle for some time to suddenly saturate the system with newly arrived traffic. A beneficial side-effect of this limit is that, over time, as the queues which are located earlier than others in this "Nth" request interval no longer need credit (due to, for example, a lack of traffic), the queues listed later can gain access to more of the burst group's credit. This creates a natural order of precedence, which can be taken advantage of when configuring the bandwidth allocation table relative to the burst group update interval. This creates the ability to differentiate queue types (e.g., high precedence versus best effort queues). This is a dynamic assignment, in that a given queue can be configured either way (high precedence versus best effort) and changed on the fly by adjusting the configuration of the bandwidth allocation table 50 while traffic is running.

Figure 7:
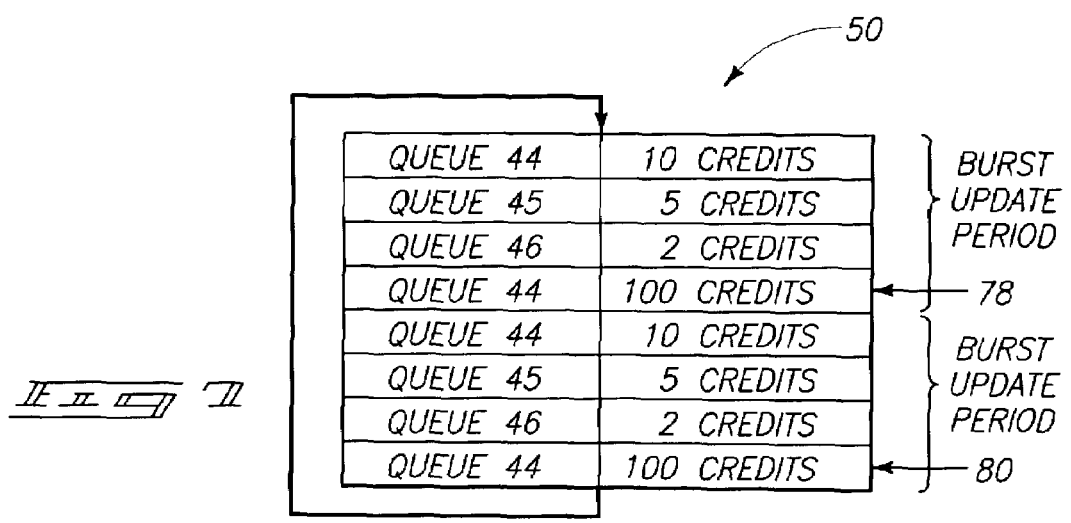
FIG. 7 is a table illustrating burst group cleanup.

This can be extended further by intentionally sequencing queues in the BAT such that a queue that may have made a request early in the burst group interval (early in the bandwidth allocation table 50) is listed again at the end of the interval where it can request a maximum request value. This is shown in FIG. 7. More particularly, FIG. 7 shows how a queue 44 that was listed previously in a burst update period is listed again at the end (see rows 78 and 80) to "get" the rest of the remaining credit from the period's available burst credit. This provides the ability to guarantee burst allocation to queues 44, 45, and 46, in that order, and then allow queue 44 to have whatever is left over. This gives the queue a guaranteed minimum amount of credit, plus the ability to take advantage of any unused credit (bandwidth). This results in better utilization of the system 10 as a whole, by sharing the allocation of the burst group dynamically across the members of the group (or groups in the case where a queue is assigned to be a member of more than one group).

While FIGS. 6 and 7 show a table, other methods for storing and arranging data can, of course, be used.

Figure 8:
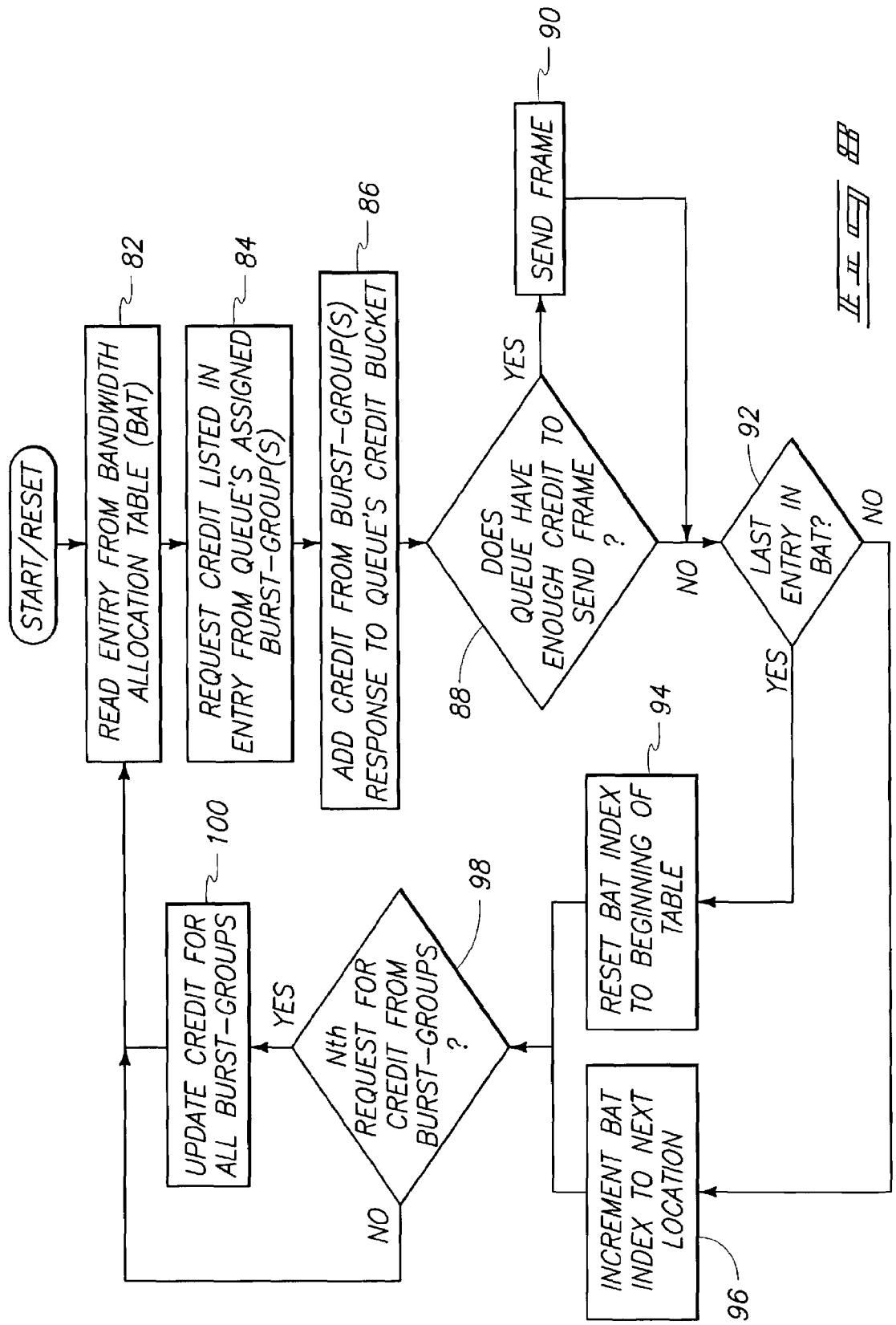
FIG. 8 is a flowchart illustrating how credit updating takes place for queues and for burst groups, defining the flow for managing FIGS. 4-7.

FIG. 8 is a flowchart illustrating how the shaping engine 34 updates credit for queues and for burst groups.

In step 82, an entry 68-75 is read from the bandwidth allocation table 50.

In step 84, the amount of credit listed in the read entry 68-75 is requested from the credit allocation circuit or mechanism 51 of the queue's assigned burst group or groups.

In step 86, credit is added from the burst group's response to the queue's credit bucket.

In step 88, a determination is made as to whether the queue has enough credit to send a frame. If so, the frame is sent in step 90.

In step 92, a determination is made as to whether this entry is the last entry in the bandwidth allocation table 50. If so, the BAT index is reset to the beginning 68 of the bandwidth allocation table 50 in step 94. If not, the BAT index is incremented in step 96 to the next location or row in the bandwidth allocation table 50.

In step 98, a determination is made as to whether this is the Nth request for credit from the burst groups. If so, credit is updated for all burst groups in step 100 and process flow continues at step 82. If not, process flow skips step 100 and continues at step 82.

The preferred embodiment provides a solution that is scalable, and provides the ability to shape traffic for a variety of implementations in a cost effective manner. This results in a smaller overall design.

The preferred embodiment of the invention provides a centralized queuing structure, capable of supporting one or more ports, with a high queue density count. This centralized queuing structure is capable of dynamically supporting different ports over time, rather than a fixed set of queues only able to support a single port or ports. The design of the preferred embodiment is also scalable. The design of the preferred embodiment, by its very nature, can be implemented for one queue up to the feasible limits of today's technology, without significantly increasing the size of the central engine. The only increase to the cost of increasing size is the space needed for the linked-list management. Further, the design of the preferred embodiment by its very nature can be implemented to support an infinite variety of min./max. rate relationships. Previous implementations could only perform gross granularity transitions for various desired rates.

The preferred environment is all of Ethernet. Slight modification to "shaping" profiles would allow for use in any communications technology including, for example, ATM and SONET.

In one embodiment, the first queuing stage is included in a single ASIC, which provides for sufficient clock-speed to support Gigabit Ethernet rates.

Various alternative embodiments are possible. For example, one alternative embodiment has a reduced or increased number of queues.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A data traffic shaping system, comprising:
   a plurality of burst groups, each burst group having a burst group credit allocation mechanism configured to earn credit over time;
   a shaping engine configured to classify incoming entries of traffic and to assign an incoming entry of traffic to a selected queue of one of the burst groups depending on characteristics of the entry;

a plurality of queues, respective queues belonging to respective burst groups; and a bandwidth allocation table including locations identifying a queue and an amount of bandwidth credit to allocate to that queue, the shaping engine being configured to traverse the locations, to determine the bandwidth earned by the queues, and to process an entry in that queue only if both the queue and the burst group with which the queue is associated have respectively earned a predetermined minimum amount of credit.

2. A data traffic shaping system in accordance with claim 1 wherein a queue is associated with multiple burst groups and wherein an entry in that queue is processed only if both the queue and at least one of the burst groups with which the queue is associated have respectively earned a predetermined minimum amount of credit.

3. A data traffic shaping system in accordance with claim 1 wherein the bandwidth allocation table is traversed at a fixed rate.

4. A data traffic shaping system in accordance with claim 1 wherein the burst groups earn credit more often than the queues earn credit.

5. A data traffic shaping system in accordance with claim 4 wherein respective burst groups earn credit in lower amounts, each time they are updated, than the queues.

6. A data traffic shaping system in accordance with claim 1 wherein the queues respectively have an upper bound on the amount of credit they can accumulate.

7. A data traffic shaping system in accordance with claim 1 wherein the order in which queues earn credit in the bandwidth allocation table is reconfigurable on the fly while traffic entries are being processed.

8. A data traffic shaping system in accordance with claim 1 wherein the credit amounts for respective queues in the bandwidth allocation table is reconfigurable while traffic entries are being processed.

9. A data traffic shaping system in accordance with claim 1 wherein queues are sequenced in the bandwidth allocation table such that a queue that is listed twice in the table, including at the end of the table, to take advantage of any unused credit.

10. A data traffic shaping system in accordance with claim 1 wherein each queue is defined by a linked list.

11. A method for shaping traffic from a plurality of data streams, the method comprising:
providing a plurality of FIFO queues;
assigning each queue to a burst group;
assigning traffic to the queues depending on characteristics of the traffic;
controlling traffic flow out of the queues using a bandwidth allocation table and a burst group bandwidth credit allocation mechanism, the burst group bandwidth credit allocation mechanism being configured to allocate bandwidth credit to the burst group over time, and using time division multiplexing to periodically allocate an amount of bandwidth credit specified by the bandwidth allocation table to individual guess;
wherein burst groups are allocated a second amount of bandwidth credit over time at a steady rate; and
wherein an amount of traffic is permitted to flow out of a queue when the queue has earned a predetermined amount of bandwidth credit and wherein the burst group with which that queue has been assigned has also earned at least the predetermined amount of bandwidth credit.

12. A method for shaping traffic in accordance with claim 11 and further comprising defining the queues, at least in part, using linked lists.

13. A method for shaping data traffic, comprising:
providing a plurality of queues;
assigning the queues to burst groups, each burst group earning bandwidth over time;
classifying incoming entries of traffic and assigning an incoming entry of traffic to a selected queue of a selected burst group depending on characteristic of the entry;
providing a memory including locations identifying a queue and the amount of bandwidth credit to allocate to that queue;
allocating bandwidth to each of the queues using time division multiplexing by traversing the memory locations in a repeating order to determine the bandwidth allocatable to each of the queues; and
releasing an entry from a queue when the queue has earned a predetermined amount of credit provided that the burst group to which the queue is assigned has also earned a predetermined amount of bandwidth.

14. A method for shaping data traffic in accordance with claim 13 and further comprising assigning a queue to multiple burst groups, and wherein an entry in that queue is released only if both the queue and at least one of the burst groups with which the queue is associated have earned a predetermined minimum amount of bandwidth.

15. A method for shaping data traffic in accordance with claim 13 wherein the memory locations are traversed at a constant rate.

16. A method for shaping data traffic in accordance with claim 13 wherein the burst groups earn bandwidth more often than the queues earn bandwidth.

17. A method for shaping data traffic in accordance with claim 13 wherein respective burst groups earn bandwidth in lower amounts, each time they are updated, than the queues.

18. A method for shaping data traffic in accordance with claim 13 wherein the queues respectively have an upper bound on the amount of bandwidth they can accumulate.

19. A method for shaping data traffic in accordance with claim 13 wherein the order in which queues earn bandwidth is reconfigurable while traffic entries are being processed.

20. A method for shaping data traffic in accordance with claim 13 wherein the bandwidth amounts for respective queues in the memory locations are reconfigurable while traffic entries are being processed.

21. A method for shaping data traffic in accordance with claim 13 wherein queues are sequenced in the memory locations such that a queue that is listed twice in the sequence, including at the end of the sequence, to take advantage of any unused credit.

22. A method for shaping data traffic in accordance with claim 13 wherein each queue is defined by a linked list.

* * * * *

UNITED STATES PATENT AND TRADEMARK OFFICE
CERTIFICATE OF CORRECTION

PATENT NO.         : 7,277,389 B2                                         Page 1 of 1
APPLICATION NO. : 10/231788
DATED              : October 2, 2007
INVENTOR(S)        : Bly et al.

It is certified that error appears in the above-identified patent and that said Letters Patent is hereby corrected as shown below:

Col. 7, line 58, Claim 11-
  Replace "bandwidth allocation table to individual guess;"
  With --bandwidth allocation table to individual queues;--

Col. 8, line 41, Claim 17-
  Replace "claim 13 wherein respective burst groups earn bandwidth in"
  With --claim 16 wherein respective burst groups earn bandwidth in--

Signed and Sealed this

Eighteenth Day of December, 2007

JON W. DUDAS
*Director of the United States Patent and Trademark Office*